United States Patent
Sherman

[19]

[11] Patent Number: 5,978,387
[45] Date of Patent: Nov. 2, 1999

[54] DYNAMIC ALLOCATION OF DATA TRANSMISSION RESOURCES

[75] Inventor: Frederick A. Sherman, Mesquite, Tex.

[73] Assignee: MCI Communications Corporation, Washington, D.C.

[21] Appl. No.: 08/660,686

[22] Filed: May 31, 1996

[51] Int. Cl.⁶ .................. H04J 3/16; H04J 3/22; H04Q 11/04

[52] U.S. Cl. ............ 370/468; 370/355; 370/358; 370/412; 370/458

[58] Field of Search .................. 370/468, 410, 370/431, 458, 477, 464, 465, 462, 358, 355, 412, 348; 379/230

[56] References Cited

U.S. PATENT DOCUMENTS

| | | | |
|---|---|---|---|
| 4,679,191 | 7/1987 | Nelson et al. | 370/355 |
| 5,463,620 | 10/1995 | Sriram | 370/412 |
| 5,526,350 | 6/1996 | Gittins et al. | 370/468 |
| 5,574,724 | 11/1996 | Bales et al. | 370/410 |
| 5,598,417 | 1/1997 | Crisler et al. | 370/348 |
| 5,790,551 | 8/1998 | Chan | 370/458 |

FOREIGN PATENT DOCUMENTS

WO 96/38018  11/1996  WIPO .............. H04Q 11/04

*Primary Examiner*—Jason Chan
*Assistant Examiner*—Melissa Kay Carman

[57] ABSTRACT

A system and method for dynamically provisioning digital data services. Connection setup for the digital data services is accomplished through messages transported on a common channel signaling network. These messages permit an originating user to automatically provision a data communications connection that has a dynamically adjustable bandwidth.

9 Claims, 5 Drawing Sheets

DYNAMIC ALLOCATION OF DATA TRANSMISSION RESOURCES

BACKGROUND OF THE INVENTION

1. Field of the Invention

The present invention relates generally to high-bandwidth services, and more specifically the present invention is directed toward the dynamic allocation of digital data services.

2. Related Art

Current telecommunications networks provide both voice and digital data services to end users. Voice services are provided via standardized DS0 channels having a 64 kbit/s capacity. Typical digital data services, on the other hand, are provided via higher rate T1 (or DS1) channels. T1 channels have a capacity equivalent to 24 DS0 channels. Other digital data services can be provided via DS2, DS3, or DS4 channels that have capacities equivalent to N*DS1.

Charges for these network services are based upon connection time and the amount of channel capacity. For voice services, the standard DS0 channel is used in its entirety to carry an audio bandwidth of 4 kHZ. This represents the basic building block of the fee structure. DS0 connections over the telecommunications network are controlled by messages (e.g., SS7) in a common channel signaling (CCS) network. These CCS messages allow an end user (i.e., originating caller) to create and terminate a DS0 connection at will, assuming the network can accommodate the telephone call.

For digital data services, the end user has minimal control over both the bandwidth and the initiation/termination of the connection. The following example provides an illustration of the end user's limitations.

Assume Company A requires a digital data service for communication between two locations. The communication between these two locations has varying rates including (1) a low data rate for mail-type data during the workday, and (2) a higher data rate for system backups after hours. In conventional digital data service allocation, a fixed bandwidth connection is provisioned between the two locations. This fixed bandwidth connection is manually provisioned and dedicated to the end-user (i.e., 24 hours a day and 7 days a week). The amount of bandwidth in the dedicated connection is typically determined by the peak usage by the end user. In this example, the bandwidth of the connection would be equivalent to the peak bandwidth required during system backup.

As one can readily appreciate, the provisioning of this type of digital data service has numerous problems. First, unlike a standard telephone call, manually provisioning is not immediately responsive to the end-user's needs. Second, and more importantly, the end user is charged for services (i.e., bandwidth) that are unused. In this example, Company A is charged for the excess bandwidth that is unused during the workday.

Generally, since the digital data service is a dedicated connection, the end user cannot terminate the connection when the service is not required. Moreover, during an existing connection, the end user cannot dynamically change the bandwidth in the connection to adjust for varying rates of data transmission. Therefore, what is needed is a system and method for providing high rate digital data services that are dynamically adjustable to the end user's needs. This dynamic provisioning would ensure that the end user is charged for switched services in proportion to what is actually used.

SUMMARY OF THE INVENTION

The present invention satisfies the above mentioned needs by providing a system and method for automatically provisioning high rate digital data services. Automatic provisioning is enabled through the transport of newly defined connection setup messages over a common channel signaling (CCS) network. These messages include information concerning the originating user, the terminating user, and a plurality of channels in one or more T1s that are needed in the high rate digital data service.

This method for dynamic allocation begins with the step of sending, by an originating user, a first request for bandwidth message to a first switching point. This first request for bandwidth message identifies the originating user, a destination user, and an amount of bandwidth required in a proposed connection. Next, the first switching point sends a first bandwidth connection message to a first switch. The first bandwidth connection message identifies a connection at the first switch between incoming channels from the originating user and a first set of channels outgoing from the first switch.

After the first switch verifies the connection, the first switching point sends a second request for bandwidth message toward a second switching point in a path to the destination user. The second request for bandwidth message identifies the originating user, the destination user, and the first set of channels. Upon receipt, the second switching point sends a second bandwidth connection message to a second switch. The second bandwidth connection message identifies a connection at the second switch between the first set of channels from the first switch and a second set of channels outgoing from the second switch.

These steps are repeated until a destination switching point and a destination switch connected to the destination user are reached. At this point, the destination switching point sends a third request for bandwidth message to the destination user. The third request for bandwidth message identifies the originating user and a third set of incoming channels. Finally, if the proposed connection is accepted, the terminating user sends a bandwidth accepted message to the destination switching point. This bandwidth accepted message is relayed to the originating user via the intermediate switching points.

An additional feature of the present invention is the capability of dynamically adjusting the allocated bandwidth in an existing connection. Specifically, the originating user can add or delete one or more channels in the existing connection without breaking the connection. This dynamic adjustment is achieved through the general process described above. Instead of specifying the entire set of channels, the CCS messages identify only the set of channels that are sought to be added or deleted.

BRIEF DESCRIPTION OF THE FIGURES

The foregoing and other features and advantages of the invention will be apparent from the following, more particular description of a preferred embodiment of the invention, as illustrated in the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

As noted above, service providers have conventionally offered high-rate digital data services via dedicated access lines. The value of these manually provisioned dedicated access lines to the customers has been compromised in various respects. First, manual provisioning inherently hurts a customer's perspective of the service provider's responsiveness to the customer's needs. Customers increasingly require timely support by the service provider in helping them meet the ever-changing demands of the business environment.

Additionally, customers have become increasingly sensitive to the costs of dedicated access lines as they relate to their overall cost of doing business. The idea of paying for unneeded services cannot survive in this cost-conscious environment. Dedicated access lines are a prime culprit in violating this business maxim since they are fixed bandwidth connections that are dedicated to the customer 24 hours a day, 7 days a week. The customer is therefore paying for this service regardless of whether some or all of the available bandwidth in the fixed connection is being used.

As noted above, some customers require digital data services for only a part of the day. One example of a digital data service is a dynamically allocated video connection that is established for video conferencing or entertainment purposes. Additionally, in the context of data transfer, the customer may have variable bandwidth requirements during a single continuous connection. Automated provisioning of variable bandwidth connections is therefore required.

The present invention meets these demands by automating the provisioning process using an existing common channel signaling (CCS) network (e.g., Signaling System #7). Thus, while customer premise equipment (CPE) and T1 switches coordinate the physical connection of a high-rate digital data service, the CCS network transports messaging that facilitates the setup of the digital data service.

Figure 1:
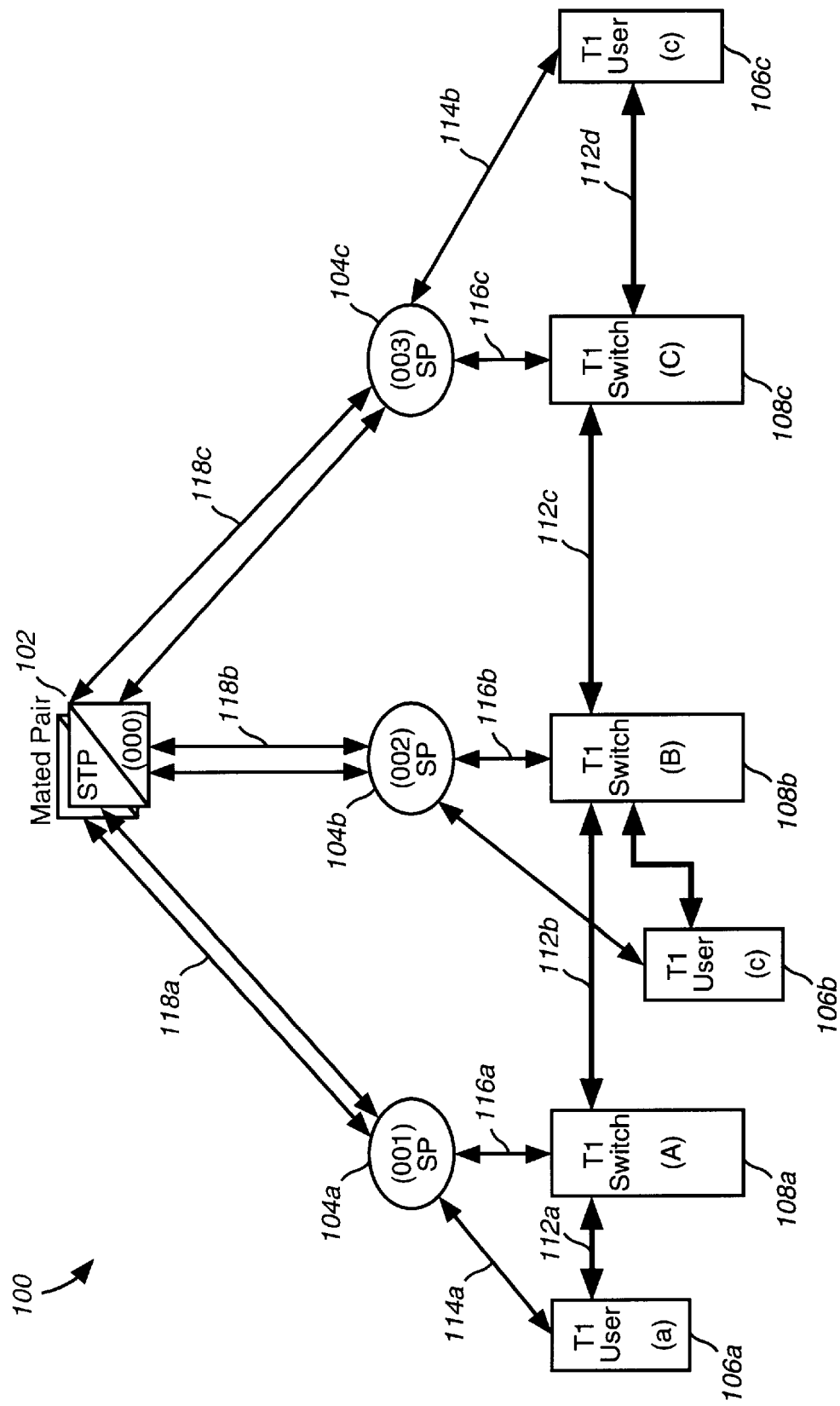
FIG. 1 illustrates a connection between an originating T1 user and a terminating T1 user.

An exemplary configuration of an end-to-end digital data service connection is illustrated in FIG. 1. In this T1-level illustration, originating CPE 106a is connected to terminating CPE 106c via links 112a–112d. Links 112a–112d are further connected by T1 switches 108a–108c. This connection defines the physical channel upon which digital data is transported from originating CPE 106a to terminating CPE 106c.

With respect to the call setup process, each of CPEs 106a, 106c and T1 switches 108a–108c interface to a CCS network. These interfaces are provided through switching points (SPs) 104a–104c. CPEs 106a, 106c are connected to SPs 104a, 104c via links 114a and 114b, respectively. T1 switches 108a–108c are connected to SPs 104a–104c via links 116a–116c, respectively. In this illustration, each SP 104a–104c is further connected to both signal transfer points (STPs) in a mated STP pair 102 via A-links 118a–118c. Clearly, in other possible connection scenarios between an originating user and a terminating user, each SP 104a–104c could be connected to a separate mated STP pair with each mated STP pair being connected by various B-links.

Using these connections, CPEs 106a, 106c, T1 switches 108a–108c, SPs 104a–104c, and mated STP pair 102 can coordinate the setup of a high rate digital channel along the links 112a–112d. This coordination is accomplished through the transport of messages that provision specific channels within links 112a–112d. In this context, channels represent fractional parts of one or more T1s that are available in any particular link 112a–112d. In combination, these fractional parts provide CPEs 106a, 106c with a total requested bandwidth. Although the following description is applied primarily to the example of setting up T1 (or fractional T1) connections, the inventive principles are intended to be applicable to the connection of any higher rate digital data service (e.g., DS2, DS3, DS4, etc.).

In provisioning a multi-channel connection between CPEs 106a, 106c, expanded functionality is required with respect to current SS7 message capabilities used in telephone call setup. One example of messages used in setting up a conventional telephone call is the ISDN users part (ISUP) messaging system. This ISUP system is described in ANSI T1.113 (1995) which is incorporated herein by reference in its entirety. Generally, the ISUP messages (e.g., an Initial Address Message) include a circuit identification code (CIC) that identifies a particular voice channel involved in the call-setup process. This CIC code is used by the switches that reside in the end-to-end path to determine which incoming channel should be connected to a particular outgoing channel.

In the context of the present invention, a message used in the call-setup for a high rate digital data service may require identification of multiple fractional parts of one or more T1 channels. A single CIC code would therefore be insufficient to unambiguously identify a plurality of channels required for the high rate digital data service. If only a single, whole T1 is being used, a single identification code could unambiguously characterize the particular T1.

To facilitate this expanded functionality, the present invention uses a set of messages to be propagated on the CCS network that connects CPEs 106a, 106c and T1 switches 108a–108c. A listing of these messages is provided in Table 1.

In one embodiment of the present invention, the messages are newly defined for transport over the CCS network. In other embodiments, the messages are modifications of existing ISUP messages. For example, unused or optional parts of currently defined ISUP messages could be used to unambiguously identify a plurality of channels in a high rate data connection.

TABLE 1

| | |
|---|---|
| BWC | Bandwidth Connection - Message sent from a SP to a T1 switch that requests a connection between incoming and outgoing channels |
| BWCR | Bandwidth Connection Response - Message sent in response to a BWC message either confirming or rejecting the request |
| BAM | Bandwidth Acknowledgment - Message sent from the destination user to the originating user either confirming or rejecting the connection |
| RFB | Request for Bandwidth - Message requesting an initial (or additional) amount of bandwidth required for the transmission of data |
| RRB | Request Remove Bandwidth - Message requesting the removal of all or part of the bandwidth previously allocated |
| BWD | Bandwidth Delete - Message from a SP to a T1 switch that requests the disconnection of at least one channel within a current connection |
| BWDR | Bandwidth Delete Response - Message sent in response to a BWD message either confirming or rejecting the request |

Figure 2:
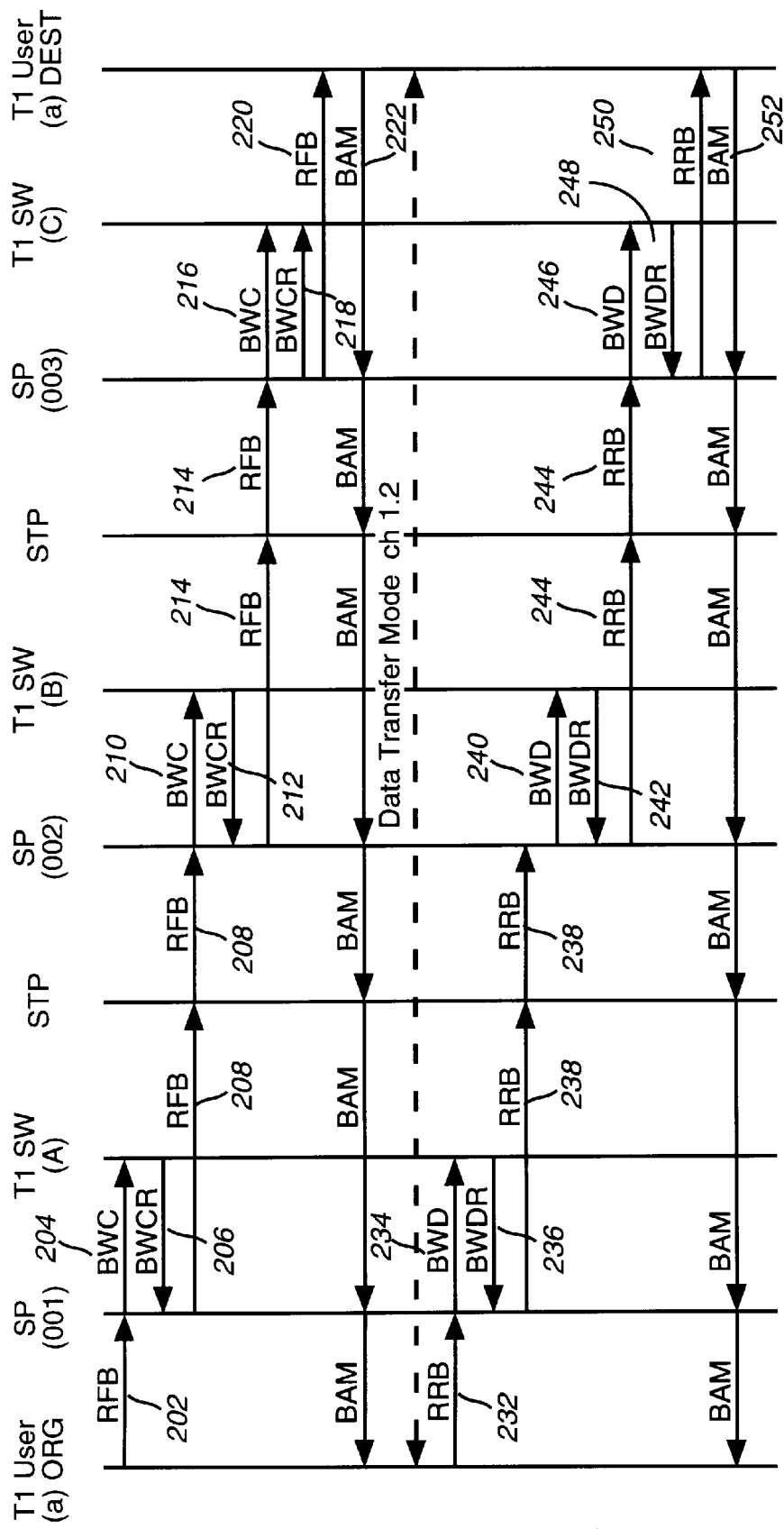
FIG. 2 illustrates the flow of connection setup messaging through a common channel signaling network.
Figure 3:
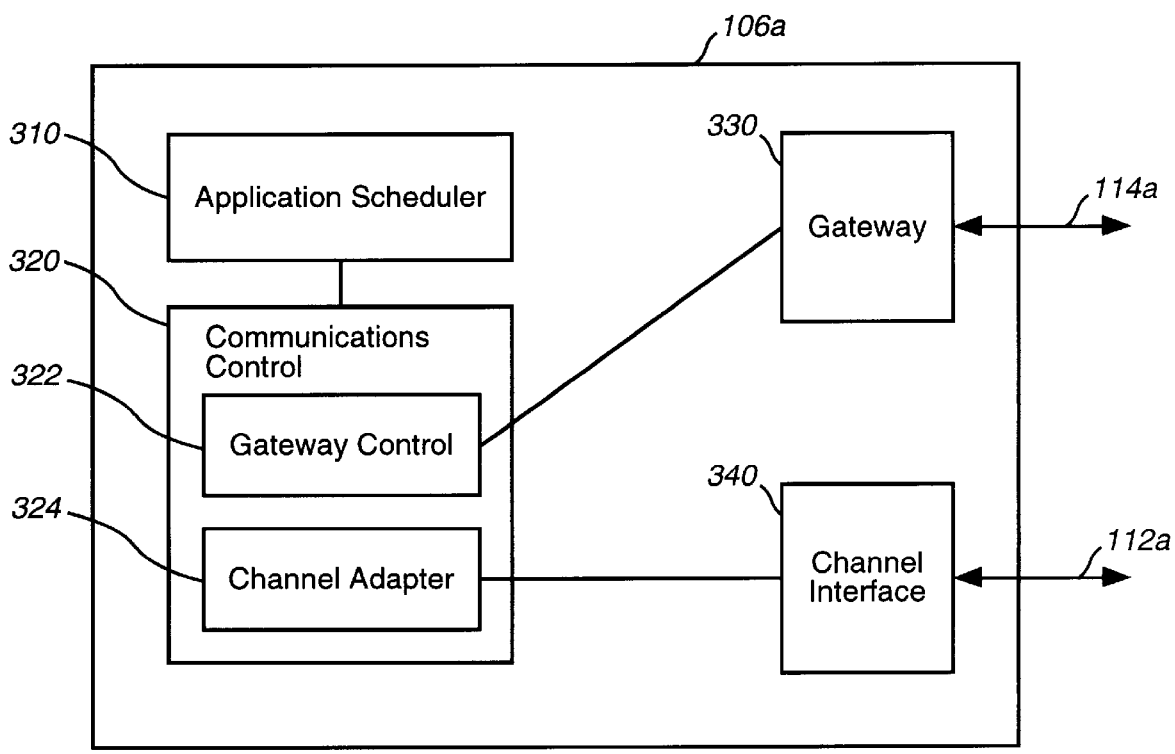
FIG. 3 illustrates block diagram of a customer premise equipment.
Figure 4:
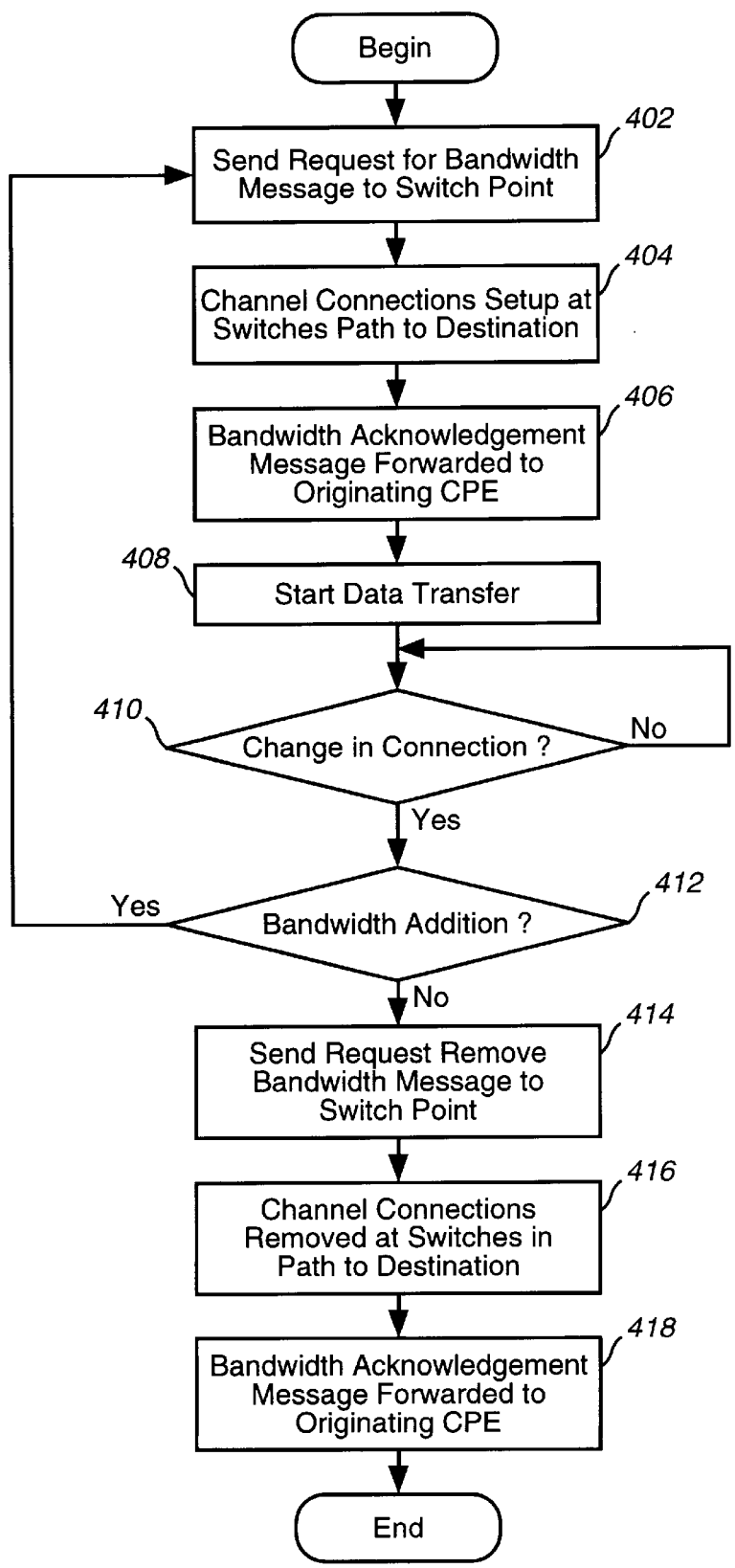
FIG. 4 illustrates a flow chart processing in the present invention.

To illustrate the use of these messages, a connection setup process is described with respect to FIGS. 1–4. FIG. 1 illustrates the connectivity between the network elements, FIG. 2 illustrates a message flow diagram between those network elements, FIG. 3 illustrates an embodiment of a CPE 106a–106c, and FIG. 4 illustrates a connection setup from the perspective of originating CPE 106a. Connection setup is described first in the context of an originating CPE 106a and then in the context of network 100.

FIG. 3 illustrates a high-level overview of hardware/software elements that are included within originating CPE 106a. Originating CPE 106a comprises application scheduler 310, communications control unit 320, gateway 330, and channel interface 340. Application scheduler 310 coordinates one or more connection requests that are generated by one or more applications. These applications can reside within CPE 106a or on other computers connected to CPE 106a via a computer network (e.g., local area network). Each of these connection requests include parameters that define the desired connection. For example, the connection request could include parameters that identify the desired bandwidth in the connection and the minimum acceptable bandwidth in the connection. Still further, the connection request could include parameters that identify a change in an existing connection.

Under the control of application scheduler 310, a connection request is sent to communications control 320 for processing. A queue (not shown) may exist between application scheduler 310 and communications control 320 to temporarily store connection requests that communications control 320 cannot immediately handle. Generally, communications control 320 comprises gateway control 322 and channel adapter 324. Gateway control 322 supports the transmission and receipt of connection setup messaging that is passed to SP 104a via gateway 330 and link 114a (e.g., RFB, BAM, etc.). Channel adapter 324, on the other hand, supports the actual data service connection that is established on links 112a–112d. For example, channel adapter 324 coordinates multiplexing and demultiplexing functions that support multi-channel connections via channel interface 340.

FIG. 4 illustrates a flow diagram of the connection setup process from the perspective of originating CPE 106a. As noted above, this process begins after CPE 106a determines that a suitable number of outgoing channels from CPE 106a to T1 switch 108a are available. If channels are available, CPE 106a sends, in step 402, a RFB message to SP 104a via gateway 330 and link 114a. In one embodiment, link 114a is a direct connection. In other embodiments, link 114a is a dial-up connection. The RFB message is used by SP 104a to setup a connection at T1 switch 108a. In a similar manner, connections are subsequently setup in each of the remaining T1 switches 108b, 108c that reside in the path to the destination. This connection process, represented by step 404, is described in greater detail below.

If a connection is successfully provisioned, CPE 106a receives, in step 406, a BAM message that is forwarded from terminating CPE 108c. Thereafter, data transfer commences in step 408. As noted above, an application can modify the bandwidth in an existing connection. First, a determination is made in step 410 whether the connection should be modified. If no modification is required, CPE 106a continues the data transfer on the existing connection.

If a modification is required, a second determination is made in step 412 whether bandwidth (i.e., channels) are sought to be added or deleted. If bandwidth is sought to be added, the process returns to step 402 where CPE 106a sends a second RFB message that identifies the additional bandwidth requirements. Steps 404 and 406 would then follow to setup the actual connection for the additional channels.

If bandwidth is sought to be deleted, the process moves to step 414 where CPE 106a sends an RRB message to SP 104a. The RRB message identifies an amount of bandwidth that is sought to be deleted. Clearly, this amount of bandwidth could represent all the bandwidth in the connection. Generally, steps 414, 416, and 418 operate in a similar manner to steps 402, 404, and 406. Instead of setting up connections, the RRB message is used by SP 104a to remove one or more channel connections at T1 switch 108a. In step 416, connections are removed in each of the remaining T1 switches 108b, 108c that reside in the path to the destination. Finally, in step 418, a BAM message is forwarded from terminating CPE 108c to originating CPE 108a.

Having described a connection setup process from the standpoint of orginating CPE 106a, the connection process is now described from the standpoint of network 100. Specifically, the message flow illustrated in FIG. 1 is described. Again, although this description is described with respect to T1 channels, it should be understood that the same process is applicable to any high rate digital data service connection that comprises a plurality of channels.

As shown in FIG. 2, the connection setup process for a T1 or a fractional part thereof, starts with originating CPE 106a sending RFB 202 to SP 104a via link 114a. RFB 202 includes information that identifies CPE 106a, the required bandwidth in the proposed connection, and the destination of the connection (i.e., the terminating user). With respect to the required bandwidth, RFB 202 includes information that identifies one or more outgoing channels in one or more T1s from CPE 106a.

On receiving RFB 202, SP 104a identifies a connection at T1 switch 108a between incoming channels from CPE 106a and outgoing channels to T1 switch 108b. This determination is based upon information contained in a database (not shown) within SP 104a. Generally, the database includes information that identifies all incoming and outgoing channels, the status or availability of each of the channels. The database also includes routing information that identifies a path that incoming channels can take to get to the final destination point.

After the database inquiry by SP 104a identifies a possible connection, SP 104a sends BWC 204 to T1 switch 108a. BWC 204 identifies the proposed connection between incoming and outgoing channels at T1 switch 108a. Again, it should be noted that the fractional T1 channels can reside in one or more T1s that are switched at T1 switch 108a. If T1 switch 108a is able to complete the proposed connection identified by BWC 204, T1 switch 108a returns BWCR 206 to SP 104a verifying the connection.

Upon receipt of BWCR 206, SP 104a will send RFB 208 to one of the STPs within mated STP pair 102 (hereinafter referred to as STP 102). RFB 208 includes information that identifies T1 switch 108a, the outgoing channels from T1 switch 108a, and the destination. Next, STP 102 forwards RFB 208 to SP 104b based on the information contained in RFB 208. SP 104b is the next switching point in the path to the terminating user.

In a similar manner to SP 104a, SP 104b identifies a connection at T1 switch 108b between incoming channels from T1 switch 108a and outgoing channels to T1 switch 108c. After this determination is made, SP 104b sends BWC 210 to T1 switch 108b identifying a proposed connection between incoming and outgoing channels. If T1 switch 108b is able to complete the proposed connection identified by BWC 210, T1 switch 108b returns BWCR 212 to SP 104b verifying the connection.

As one can readily appreciate, this process can continue through numerous intermediate switching points before reaching the terminating user. These intermediate switching points can be connected through additional mated STP pairs.

Next, upon receipt of BWCR 212, SP 104a sends RFB 214 to STP 102. RFB 214 includes information that identifies T1 switch 108b, the outgoing channels from T1 switch 108b, and the destination. STP 102 forwards RFB 214 to SP 104c based on the information contained in RFB 214. SP 104c is the final switching point in the path to the terminating user.

Next, SP 104c identifies a connection at T1 switch 108c between incoming channels from T1 switch 108b and outgoing channels to CPE 106c associated with the terminating user. After this determination is made, SP 104c sends BWC 216 to T1 switch 108c identifying a proposed connection between incoming and outgoing channels. If T1 switch 108c is able to complete the proposed connection identified by BWC 216, T1 switch 108c returns BWCR 218 to SP 104c verifying the connection.

SP 104c, being the end office, sends RFB 220 to CPE 106c. RFB 220 identifies the originating T1 user and the outgoing channels from T1 switch 108c. If the proposed connection is accepted, CPE 106c sends BAM 222 to SP 104c. SP 104c forwards BAM 222 to STP 102. As illustrated by the message flow in FIG. 2, BAM 222 is propagated back to CPE 106a via SPs 104a and 104b. At this point, CPEs 106a and 106c have a complete communications path to transfer data.

As noted above, one of the features of the present invention is the ability for a user to dynamically allocate the bandwidth in the connection to meet changing communication needs. This control ensures that the user will pay a service provider only for the bandwidth that is actually used.

In one example, the originating user may require an increase in bandwidth. The provisioning of additional bandwidth to an existing connection closely parallels the process described above. The same sequence of messages 202–222 is used. Instead of specifying all of the channels in the connection, however, messages 202–222 specify only the additional channels between CPEs 106a, 106c. The flow of messages 202–222 does not interrupt the transfer of data on the existing connection. Significantly, even though a temporary halt in communication occurs due to the reconfiguration at CPEs 106a, 106c to accommodate the additional bandwidth, the connection between CPEs 106a and 106c is maintained. This feature further aids the seamless nature in which high rate data services are provisioned.

Alternatively, the originating user may require a decrease in bandwidth or the termination of all the bandwidth in the existing connection. This sequence of message in the bandwidth reduction process again is similar to messages 202–222 in the connection setup process. As illustrated at the bottom of FIG. 2, RRB messages 232, 238, 244, and 250 replace RFB messages 202, 208, 214 and 220, BWD messages 234, 240, and 246 replace BWC messages 204, 210, and 216, and BWDR messages 236, 242, and 248 replace BWCR messages 206, 212, and 218. Like in the connection setup process BAM 252 is returned to CPE 106a from CPE 106c. Generally, instead of setting up connections between incoming and outgoing channels, RRB, BWD, and BWDR messages 232–250 operate to remove existing connections between one or more incoming and outgoing channels.

Figure 5:
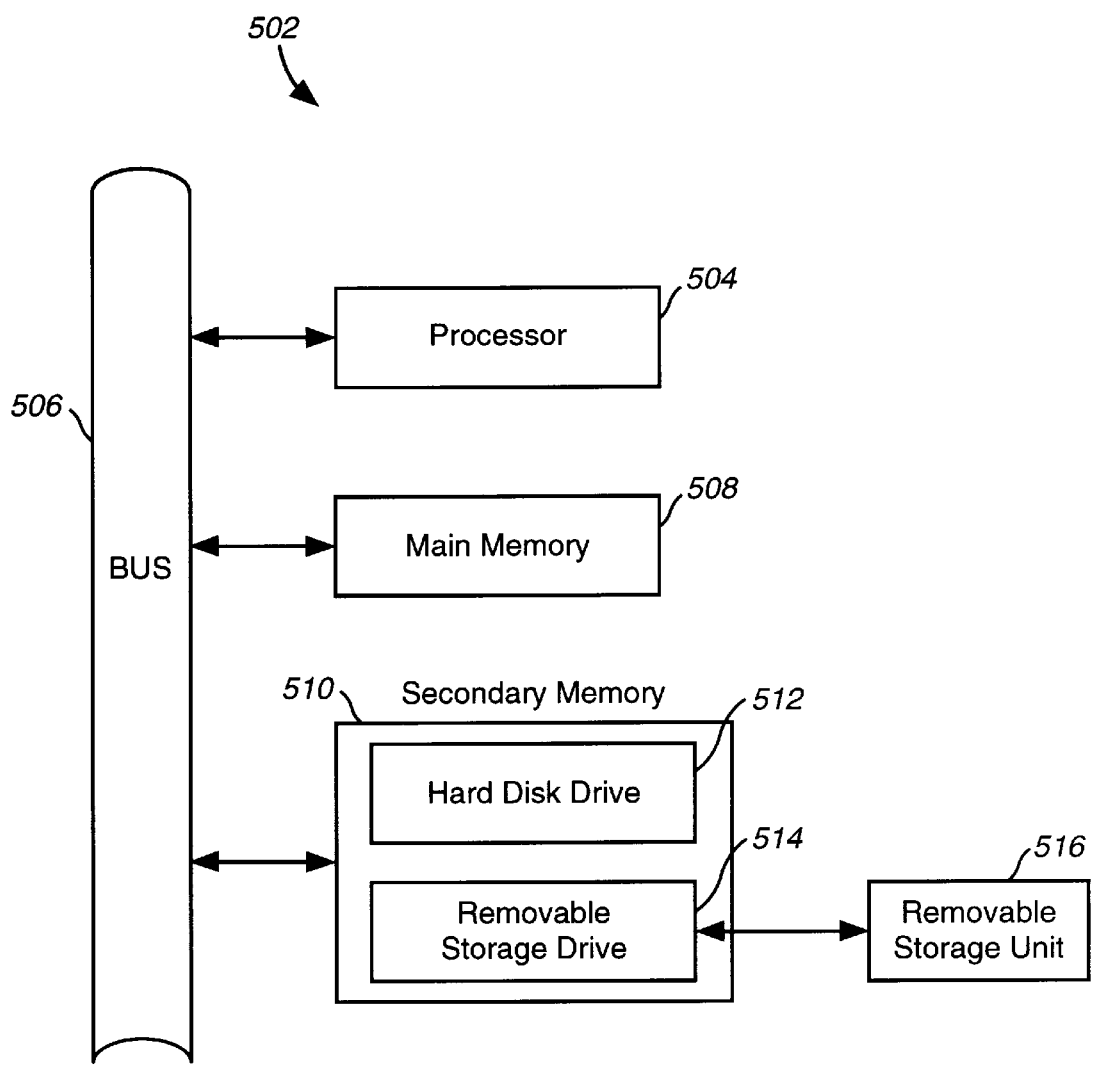
FIG. 5 illustrates a block diagram of a computer useful for implementing elements of the present invention.

In one embodiment, the invention is directed to a computer system operating as discussed herein. An exemplary computer system 502 is shown in FIG. 5. The computer system 502 includes one or more processors, such as processor 504. The processor 504 is connected to a communication bus 506.

The computer system 502 also includes a main memory 508, preferably random access memory (RAM), and a secondary memory 510. The secondary memory 510 includes, for example, a hard disk drive 512 and/or a removable storage drive 514, representing a floppy disk drive, a magnetic tape drive, a compact disk drive, etc. The removable storage drive 514 reads from and/or writes to a removable storage unit 516 in a well known manner.

Removable storage unit 516, also called a program storage device or a computer program product, represents a floppy disk, magnetic tape, compact disk, etc. As will be appreciated, the removable storage unit 516 includes a computer usable storage medium having stored therein computer software and/or data.

Computer programs (also called computer control logic) are stored in main memory and/or the secondary memory 510. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In another embodiment, the invention is directed to a computer program product comprising a computer readable medium having control logic (computer software) stored therein. The control logic, when executed by the processor 504, causes the processor 504 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method for dynamically allocating a data channel, comprising the steps of:

(1) sending by an originating user a first request for bandwidth message to a first switching point in a common channel signaling network, said first request for bandwidth message identifying said originating user, a destination user, and an amount of bandwidth required in a proposed connection;

(2) sending by said first switching point a first bandwidth connection message to a first switch, said first bandwidth connection message identifying a connection at said first switch between incoming channels from said originating user and a first set of channels that are outgoing from said first switch;

(3) sending by said first switching point a second request for bandwidth message toward a second switching point in said channel signaling network in a communications rotate to said destination, said second request for bandwidth message identifying said originating user, said destination user, and said first set of channels;

(4) sending by said second switching point a second bandwidth connection message to a second switch in a communication to said destination user, said second bandwidth connection message identifying a connection at said second switch between said first set of channels and a second set of channels that are outgoing from said second switch;

(5) repeating steps (3) and (4) until a destination switching point and a destination switch connected to said destination user are reached;

(6) sending by said destination switching point a third request for bandwidth message to said destination user, said third request for bandwidth message identifying said originating user and a third set of channels in a proposed connection; and (7) sending by said destination user a bandwidth accepted message to said destination switching point if said destination user accepts said proposed connection.

2. The method of claim 1, further comprising the step of:

(8) sending by said originating user a fourth request for bandwidth message to said first switching point, said fourth request for bandwidth message identifying an amount of additional bandwidth required in a previously accepted connection;

(9) repeating said steps (2)–(4) until said destination switching point and said destination switch connected to said destination user are reached;

(10) sending by said destination switching point a fifth request for bandwidth message to said destination user, said fifth request for bandwidth message identifying a fourth set of additional channels necessary to provide said additional bandwidth;

(11) sending by said destination user a bandwidth accepted message to said destination switching point if said destination user accepts said additional bandwidth; and

(12) modifying by said destination user said previously accepted connection to include said additional bandwidth, wherein said step of modifying is performed without breaking said previously accepted connection.

3. The method of claim 1, further comprising the step of:

(8) sending by said originating user a first request remove bandwidth message to said first switching point, said first request remove bandwidth message identifying an amount of bandwidth in a previously accepted connection that is unneeded;

(9) sending by said first switching point a bandwidth delete message to said first switch, said bandwidth delete message identifying a fourth set of channels that should be disconnected from one or more incoming channels from said originating user;

(10) sending by said first switching point a second request remove bandwidth message toward said second switching point, said second request remove bandwidth message identifying said fourth set of channels;

(11) sending by said second switching point a second bandwidth delete message to said second switch, said second bandwidth delete message identifying a fifth set of channels that should be disconnected from one or more incoming channels from said first switch;

(12) repeating steps (10) and (11) until said destination switching point and said destination switch connected to said destination user have received said bandwidth delete message;

(13) sending by said destination switching point a third request delete bandwidth message to said destination user, said third request delete bandwidth message identifying a sixth set of channels that should be disconnected in said previously accepted connection;

(14) sending by said destination user a bandwidth delete response message to said destination switching point acknowledging the disconnection of said sixth set or channels; and

(15) modifying by said destination user said previously accepted connection to remove said unneeded bandwidth, wherein said step of modifying is performed without breaking said previously accepted connection.

4. A method for modifying an existing connection between an originating user, an originating switch, a terminating switch, and a terminating user, wherein the existing connection includes a plurality of channels, the method comprising the steps of:

(1) receiving a message in the originating switch from a common signaling network that identifies a first set of incoming channels that are sought to be added or deleted from the existing connection;

(2) connecting or disconnecting, at the originating switch, the first set of incoming channels from a first set of outgoing channels;

(3) receiving a message in the terminating switch from said common signaling network that identifies a second set of incoming channels that are sought to be added or deleted from the existing connection;

(4) connecting or disconnecting, at the terminating switch, the second set of incoming channels from a second set of outgoing channels; and (5) modifying by the originating user and the terminating user the existing connection, wherein said step of modifying is performed without breaking the existing connection.

5. A communications system comprising:

a plurality of switching points in a common channel signaling network, wherein users send requests for connections to the plurality of switching points;

a plurality of switches, wherein the plurality of switches are connected to the plurality of switching points;

an originating user, connected to a first switching point within the plurality of switching points; and an end user, connected to a second switching point within the plurality of switching points, wherein the originating user sends a first request for bandwidth message to a first switching point within the plurality switching points in which the first request for bandwidth message identifies the originating user, the end user, and an amount of bandwidth required in a proposed connection; wherein the first switching point sends a first bandwidth connection message to a first switch within the plurality of switches in which the first bandwidth connection message identifies a connection at the first switch between incoming channels from the originating user and a first set of channels that are outgoing from the first switch; wherein the first switching point sends a second request for bandwidth message toward a second switching point within the plurality of switching points in a communications route to the end user in which the second request for bandwidth message identifying the originating user, the end user, and the first set of channels; wherein the second switching point sends a second bandwidth connection message to a second switch within the plurality of switches in a communications route to the end user in which the second bandwidth connection message identifies a connection at the second switch between the first set of channels and a second set of channels that are outgoing from second switch, wherein bandwidth connections messages and requests for bandwidth connection messages are sent until a communication route to the end user is formed.

6. The communications system of claim 5, wherein the end user sends a bandwidth accepted message back to the originating user.

7. The communications system of claim 5, wherein the plurality of switches is a plurality of T1 switches.

8. The communications system of claim 5, wherein the plurality of switching points is connected to a mated signal transfer points pair.

9. A communications system comprising;

a plurality of switching points in a signaling network connected to a mated signal transfer points pair, wherein users send requests for connections to the plurality of switching points;

a plurality of switches, wherein the plurality of switches are connected to the plurality of switching points;

an originating user, connected to a first switching point within the plurality of switching points; and an end user, connected to a second switching point within the plurality of switching points, wherein the originating user sends a first request for bandwidth message to a first switching point within the plurality switching points in which the first request for bandwidth message identifies the originating user, the end user, and an amount of bandwidth required in a proposed connection; wherein the first switching point sends a first bandwidth connection message to a first switch within the plurality of switches in which the first bandwidth connection message identifies a connection at the first switch between incoming channels from the originating user and a first set of channels that are outgoing from the first switch; wherein the first switching point sends a second request for bandwidth message toward a second switching point within the plurality of switching points in a communications route to the end user in which the second request for bandwidth message identifying the originating user, the end user, and the first set of channels; wherein the second switching point sends a second bandwidth connection message to a second switch within the plurality of switches in a communications route to the end user in which the second bandwidth connection message identifies a connection at the second switch between the first set of channels and a second set of channels that are outgoing from second switch, wherein bandwidth connections messages and requests for bandwidth connection messages are sent until a communications route to the end user is formed.

* * * * *